(12) United States Patent
Torcelli et al.

(10) Patent No.: US 9,091,247 B2
(45) Date of Patent: Jul. 28, 2015

(54) WIND POWER GENERATOR

(75) Inventors: Andrea Torcelli, Padua (IT); Giovanni Zinzani, Faenza (IT); Gustavo Casamenti, Forli (IT)

(73) Assignee: Bonfiglioli Riduttori S.P.A., Calderara di Reno (IT)

( * ) Notice: Subject to any disclaimer, the term of this patent is extended or adjusted under 35 U.S.C. 154(b) by 708 days.

(21) Appl. No.: 13/565,574

(22) Filed: Aug. 2, 2012

(65) Prior Publication Data

US 2013/0039763 A1 Feb. 14, 2013

(30) Foreign Application Priority Data

Aug. 3, 2011 (IT) .............................. BO2011A0482

(51) Int. Cl.
*F03D 7/02* (2006.01)
*F03D 1/06* (2006.01)

(52) U.S. Cl.
CPC ............ *F03D 7/0224* (2013.01); *F03D 1/0658* (2013.01); *F03D 7/0204* (2013.01); *F05B 2260/4031* (2013.01); *F05B 2260/74* (2013.01); *F05B 2260/76* (2013.01); *F05B 2260/79* (2013.01); *Y02E 10/721* (2013.01); *Y02E 10/723* (2013.01)

(58) Field of Classification Search
CPC ... F03D 7/0224; F03D 7/0204; F03D 1/0658; F03D 7/0208; F03D 7/0212; F03D 11/005; F03D 11/075; F03D 1/001; F03D 1/003; Y02E 10/721; Y02E 10/723; F05B 2260/79; F05B 2260/74; F05B 2260/76; F05B 2260/4031; F16H 2057/022; F16H 2057/0225; F16H 2057/2057; F16H 2057/02078; F16H 2057/02034; F16H 57/0225; H02K 7/116
USPC ...................................................... 416/9, 155
See application file for complete search history.

(56) References Cited

U.S. PATENT DOCUMENTS

| 7,470,111 | B2 * | 12/2008 | Schubert ...................... 416/155 |
| 8,696,314 | B2 * | 4/2014 | Mashue et al. ............ 416/170 R |
| 2010/0143136 | A1 * | 6/2010 | Daniels et al. ................ 416/147 |
| 2011/0142617 | A1 | 6/2011 | Mashue et al. |
| 2011/0142631 | A1 * | 6/2011 | Kawai et al. .................... 416/35 |

FOREIGN PATENT DOCUMENTS

| EP | 1596064 | 11/2005 |
| WO | 2008074320 | 6/2008 |
| WO | WO 2008074320 A1 * | 6/2008 |

OTHER PUBLICATIONS

Italian Search Report dated Mar. 5, 2012, for Italian Patent Application No. BO20110482 (2 pages).

* cited by examiner

*Primary Examiner* — Dwayne J White
*Assistant Examiner* — Brian P Wolcott
(74) *Attorney, Agent, or Firm* — McCracken & Gillen LLC

(57) ABSTRACT

A wind power generator having a nacelle, which is mounted to an upper end of a support tower, supports in rotary manner a rotor, and is oriented around a rotation axis by an orienting device provided with at least one gearmotor. The gearmotor presents an output gear coupled with a crown gear fixed to the support tower and is hinged to the nacelle so as to rotate around a fulcrum axis, which is substantially parallel to the rotation axis under the thrust of an actuation device.

18 Claims, 5 Drawing Sheets

WIND POWER GENERATOR

The present invention relates to a wind power generator.

In particular, the present invention relates to a wind power generator of the type comprising a support tower; a nacelle coupled in a rotary manner to an upper end of the support tower so as to rotate around a first rotation axis; and a rotor comprising, in turn, a central hub coupled in a rotatory manner to the nacelle and a plurality of blades coupled in a rotatory manner to the same central hub so as to rotate around respective second rotation axes.

The position of the nacelle around the first rotation axis is selectively controlled by a first orienting device comprising a first crown gear mounted on the upper end of the support tower coaxially to the first rotation axis, and a plurality of first gearmotors, which are fixed to the nacelle, are distributed around the and first rotation axis, each presenting a respective first output gear coupled with the first crown gear.

The position of each blade around the relative second rotation axis is selectively controlled by a relative second orienting device comprising a second crown gear fixed to the blade coaxially to the second rotation axis and at least a second gearmotor, which is fixed to the central hub, and presents a second output gear coupled with the second crown gear.

Each output gear has a third rotation axis parallel to, and distinct from, a longitudinal axis of the relative gearmotor, which is fixed above a lower support bracket by way of a relatively large number of fastening bolts evenly distributed around the longitudinal axis itself with a relatively small distribution pitch.

BACKGROUND OF THE INVENTION

The wind power generators of known type described above have the serious drawback that the correct coupling of the output gear of each gearmotor with the relative crown gear involves the removal of all the fastening bolts, the rotation of the gearmotor around its own longitudinal axis in such a way to exploit the eccentricity between the longitudinal axis of the gearmotor and the rotation axis of the output gear, the new fixing of the fastening bolts, and, therefore, serious operational difficulties on the part of specialized personnel and relatively long setup time of the wind power generator.

The rotation of the gearmotor around its own longitudinal axis and the disengagement of the output gear from the relative crown gear involve, in addition, in both cases, the lifting of the gearmotor from the lower support bracket, and therefore require the use of a lifting system.

SUMMARY OF THE INVENTION

The purpose of the present invention is to provide a wind power generator which is free from the drawbacks described above and which is of simple and cheap implementation.

According to the present invention there is provided a wind over generator as claimed in the appended claims.

BRIEF DESCRIPTION OF THE DRAWINGS

The present invention will now be described with reference to the accompanying drawings, which illustrate an example of a nonlimiting embodiment, wherein.

DETAILED DESCRIPTION OF THE INVENTION

Figure 1:
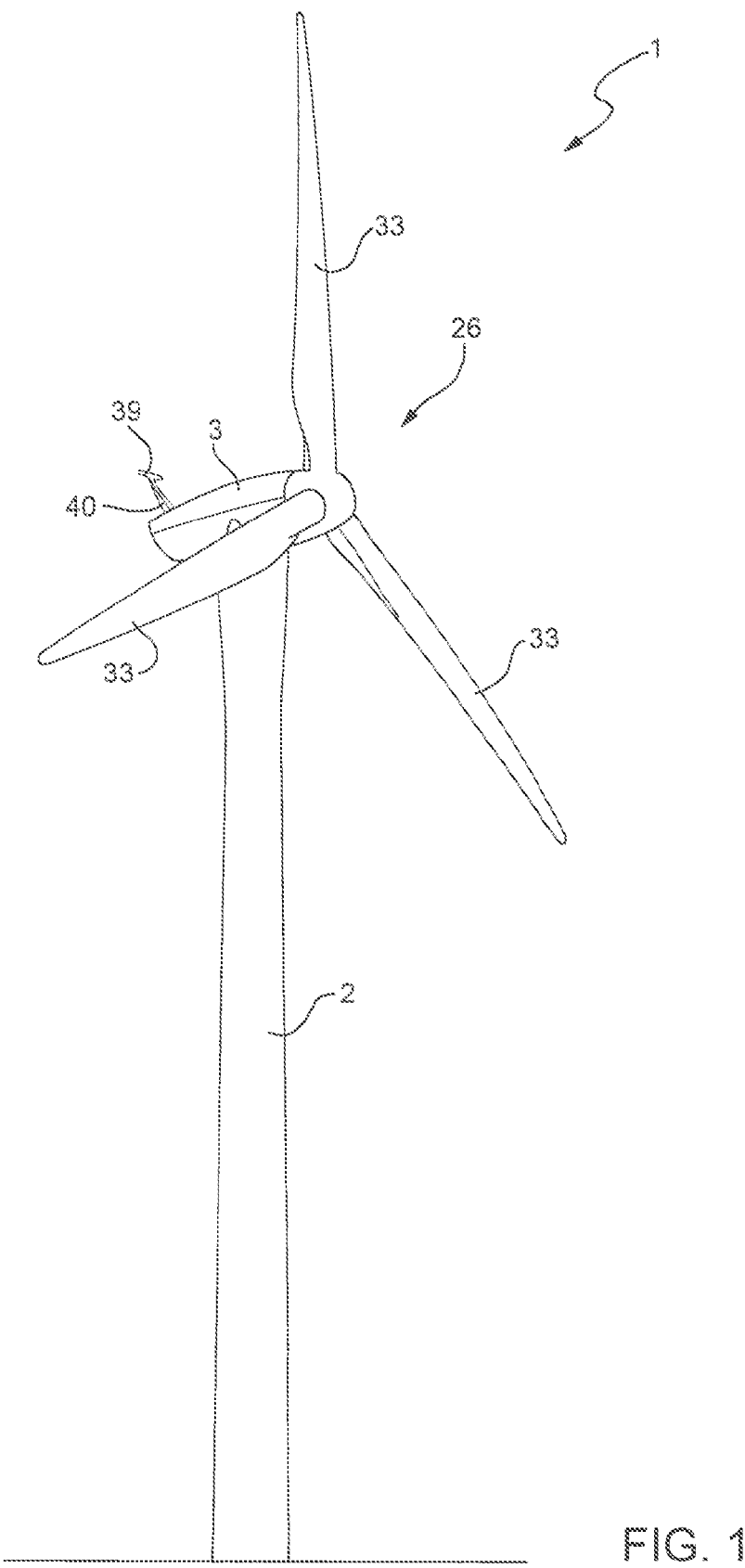
FIG. 1 is a schematic perspective view, with parts removed for clarity, of a preferred embodiment of the wind power generator of the present invention.
Figure 2:
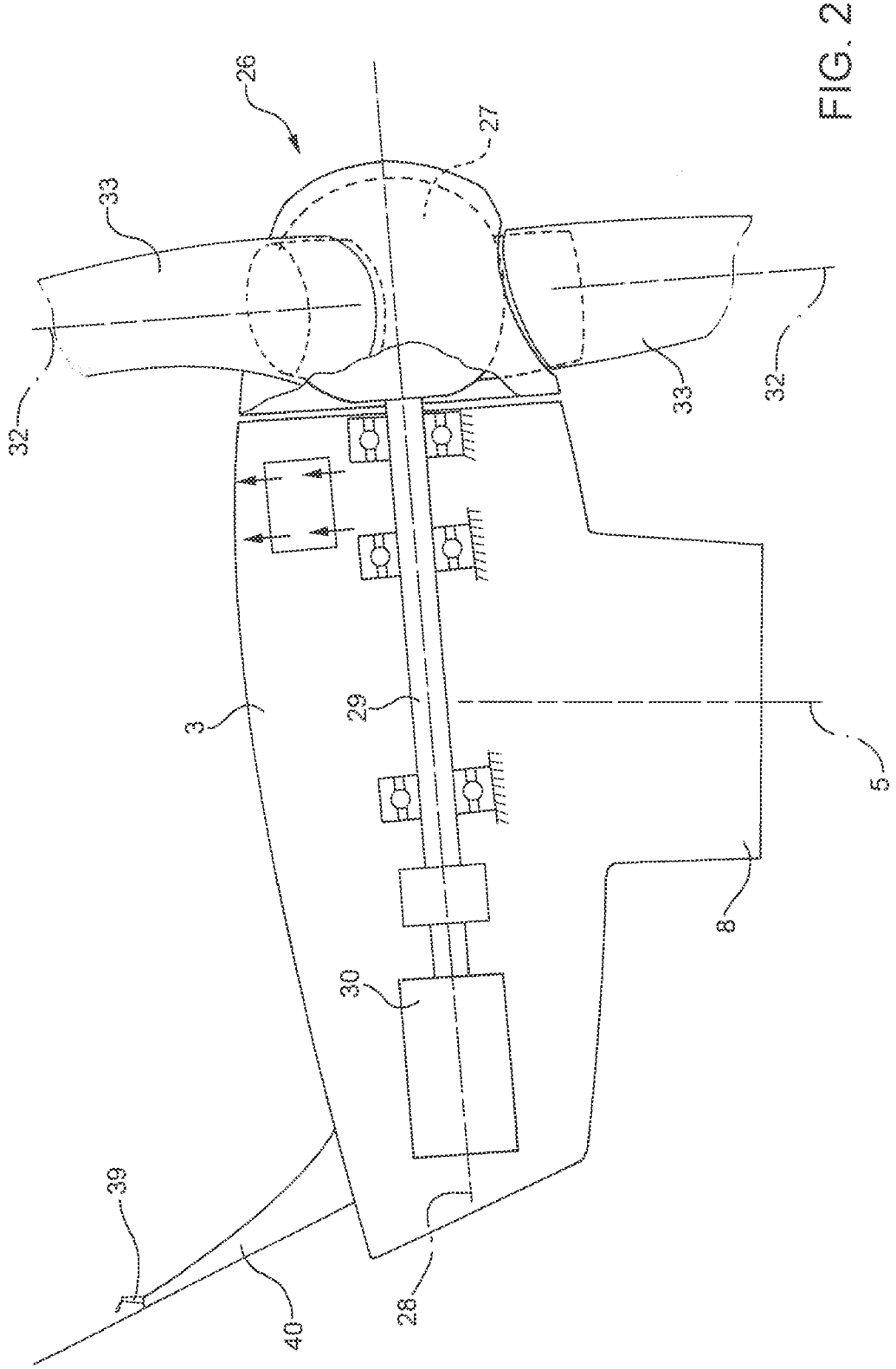
FIG. 2 is a schematic side, view, with parts removed for clarity, of a first detail of the wind power generator of FIG. 1.

With reference to FIGS. 1 and 2, number 1 indicates as a whole, a wind power generator comprising a support tower 2, which is anchored to the ground, and supports a nacelle 3 coupled in a rotatory manner to an upper end of the tower 2 to oscillate with respect to the tower 2 and under the thrust of an orienting device 4, around a given rotation axis 5.

Figure 3:
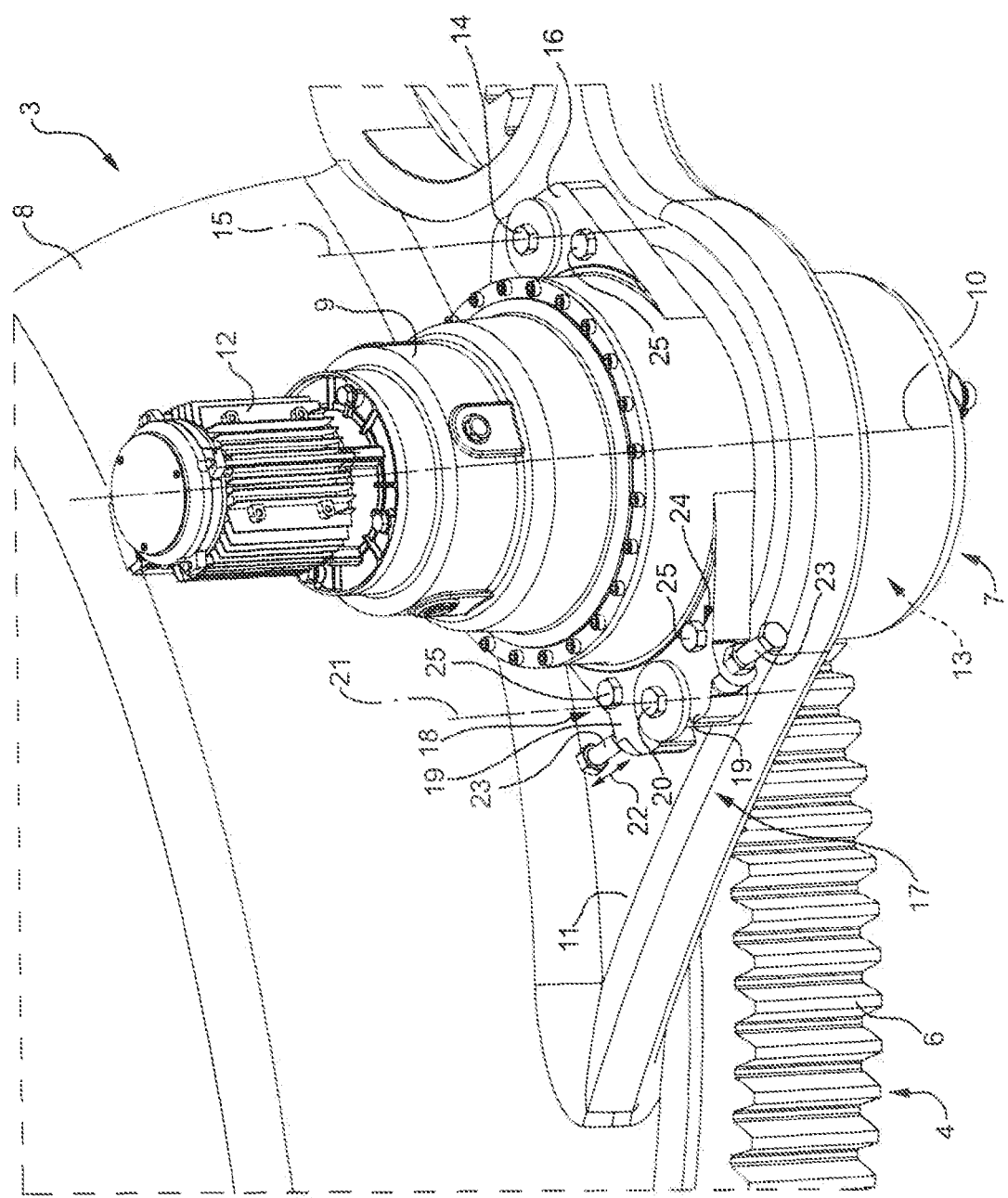
FIG. 3 is a schematic perspective view, with parts removed for clarity, of a second detail of the wind power generator of FIG. 1.
Figure 4:
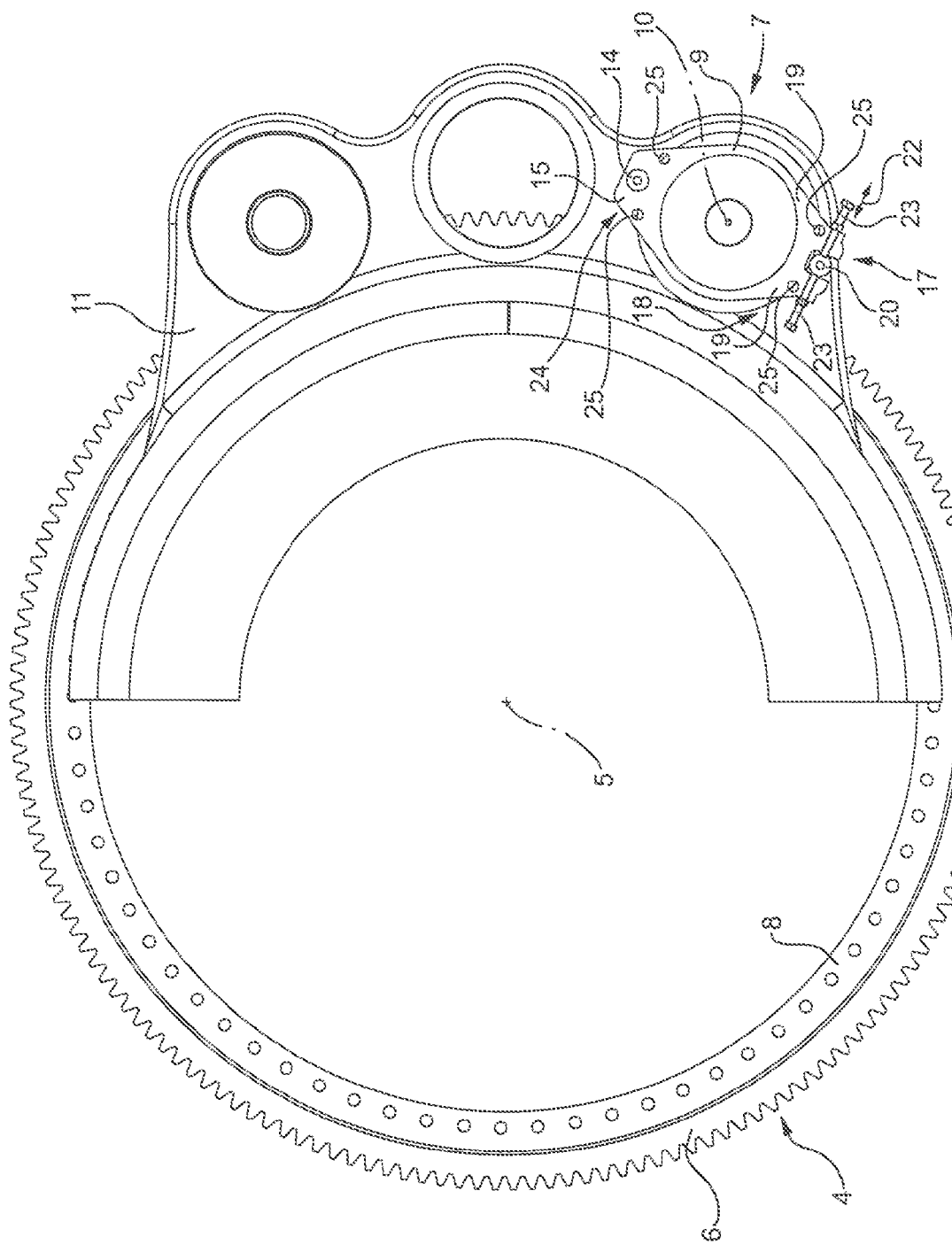
FIG. 4 is a schematic plan view, with parts removed for clarity, of the detail of FIG. 3.

As shown in FIGS. 3 and 4, the device 4 comprises, in this case, a crown gear 6 fixed to the upper end of the tower 2 coaxially with axis 5, and a plurality of gearmotors 7, which are distributed around the axis 5, and are fixed to a sleeve 8 (FIG. 2) protruding downwardly from the nacelle 3 coaxially to the axis 5 itself.

Each gearmotor 7 comprises a substantially cylindrical containing casing 9, which has a longitudinal axis 10 substantially parallel to the axis 5, extends through a support bracket 11 or protruding radially outwardly from the sleeve 8 above the crown gear 6, and carries connected at a top end an electric motor 12 of known type.

The gearmotor 7 also comprises, an output gear 13, which is rotatably mounted in correspondence to a lower end of the casing 9, extends below the bracket 11, is coupled with the crown gear 6, and is set in rotation by the motor 12 around the axis 10 by way of the interposition of a known epyciclic reduction gear, not shown, housed within the casing 9 itself.

The casing 9 is hinged to the bracket 11 by way of a coupling pin 14, which presents a longitudinal axis 15 parallel to, and distinct from, the axis 10, and extends through the bracket 11 and through a flange 16 which radially protrudes outside the casing 9.

The position of the casing 9 and, therefore, of the gear 13 around the axis 15 is selectively controlled by an actuation device 17 comprising a coupling fork 18, which radially protrudes outside the casing 9, is arranged on the opposite side of the flange 16 with respect the axis 10, and presents two arms 19 which are substantially parallel to each other.

The device 17 also comprises a limit-stop pin 20, which has a longitudinal axis 21 parallel to axis 15, protrudes upwards from the bracket 11, extends between the two arms 19, and presents a diameter which is smaller than a distance between the arms 19 measured parallel to a direction 22 transverse to the axis 21 itself.

The device 17 also comprises two regulation screws 23, which extend in the direction 22, are arranged on opposite sides of the pin 20 in the direction 22, are substantially coaxial with each other, and are screwed through the relative arms 19 to be arranged in contact with the pin 20 and exert on the pin 20 respective thrusts in the two opposite senses of direction 22 itself.

The position of the screws 23 in the direction 22 allows, therefore, to selectively control the position of the casing 9 and, therefore, of the gear 13 around axis 15.

Once properly positioned around the axis 15, each gearmotor 7 is axially locked on the relative bracket 11 by means of a locking device 24 comprising, in this case, four fastening screws 25, two of which extend through the flange 16, are screwed into the bracket 11, and are movable in relative slots (not shown) obtained through the flange 16 parallel to axis 15 and two of them extend through the arms 19 of fork 18, are screwed into the bracket 11, and are movable in relative slots (not shown) obtained through the arms 19 parallel to axis 15.

The wind power generator 1 further has a rotor 26 comprising a central hub 27 which has a substantially spherical shape, is coupled in a rotatory manner to the nacelle 3 for rotating, with respect to the nacelle 3 and under the thrust of the wind, around a rotation axis 28, and is further coupled in an angularly fixed manner to a drive shaft 29, which extends inside the nacelle 3, and controls the operation an electric generator 30 mounted in the rear part of the nacelle 3 itself.

The hub 27 presents, in this case, three openings 31, which are equally spaced around the axis 28, have relative longitudinal axes 32 substantially transverse to the axis 28, and are engaged in a rotary manner, each by a relative blade 33.

Figure 5:
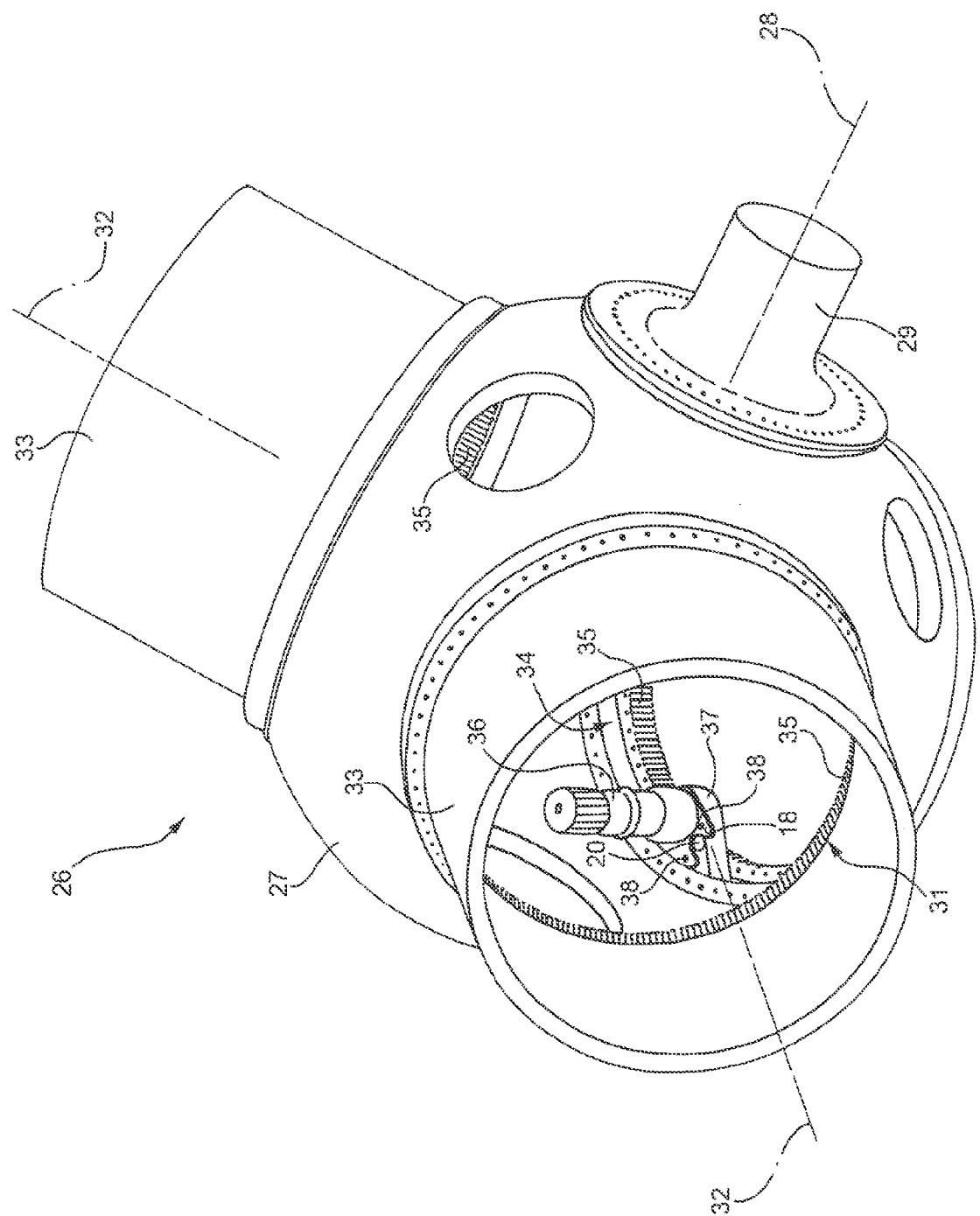
FIG. 5 is a schematic perspective view, with parts removed for clarity, of a third detail of the wind power generator of FIG. 1.

With reference to FIG. 5, the position of each blade 33 around the relative axis 32 is selectively controlled by a respective orienting device 34 comprising, in this case, a crown gear 35 fixed to the blade 33 coaxially with relative axis 32 and at least one gearmotor mounted through a bracket 37 protruding radially inside the hub 27.

The gearmotors 36 are entirely equivalent to the gearmotors 7 and will not be further described in detail since all the components of the gearmotors 7 are present in the gearmotors 36 and retain the same numbers already used.

Also in the case of the gearmotors 36, therefore, the position of each pair of screws 23 in the relative direction 22 allows to selectively control the location of the relative gearmotor 36 and, therefore, of the relative gear 13 around the relative axis 15.

Once properly positioned around the axis 15, each gearmotor 36 is axially locked on the bracket 37 by means of a locking device 38 fully equivalent to one of the devices 24.

Regarding to the mentioned above, it should be noted, moreover, that the position of the nacelle 3 around the axis 5 and of each blade 33 around the relative axis 32 is selectively controlled as a function of the data relating to wind speed and direction detected by an anemometer 39 fixed to an antenna 40 protruding from the capsule 3 itself.

The rotation of the gearmotors 7, 36 around relative axes 15 allows to:
use a relatively small number of fastening bolts 25 and, therefore, perform a relatively small number of corresponding holes (not shown) through the casings 9 and of corresponding slots (not shown) through the brackets 11 and 37;
make the gearmotors 7, 36 with the output gear 13 coaxial with the relative axes 10;
correctly position each gearmotor 7, 36 and, therefore, each gear 13 in a relatively simple and rapid way loosening the four bolts 25 and acting on the adjustment screws 23 without lifting the gearmotor 7, 36 itself;
disengage each gear 13 from the relative crown gear 6, 35 without lifting the relative gearmotor 7, 36; and
reduce the radial dimension of the gearmotors 7, 36 in the direction 22.

The invention claimed is:

1. A wind power generator comprising:
a support tower;
a nacelle coupled in a rotatory manner to an upper end of the support tower so as to rotate around a rotation axis;
a rotor coupled in a rotatory manner to the nacelle; and
an orienting device for orienting the nacelle around said rotation axis, the orienting device comprising a first gear mounted between said support tower and the nacelle and at least one gearmotor, which is mounted on a support frame between said support tower and the nacelle, and comprising a second gear coupled to the first gear; and wherein the gearmotor is hinged to said support frame so as to rotate around a fulcrum axis which is substantially parallel to said rotation axis; an actuation device being provided so as to move the gearmotor around said fulcrum axis and to selectively control the position of the gearmotor around the fulcrum axis itself.

2. A wind power generator according to claim 1, wherein the actuation device comprises at least one actuation member acting on the gearmotor in a thrust direction which is substantially transverse to said fulcrum axis.

3. A wind power generator according to claim 1 and further comprising a locking device for axially locking the gearmotor against the support frame.

4. A wind power generator according to claim 3, wherein the locking device comprises a plurality of fastening members, each of which extends through an opening through the support frame or through the gearmotor and wherein the opening includes a which is greater than a diameter of the fastening member itself.

5. A wind power generator according to claim 1, wherein the gearmotor comprises a containing casing, which is substantially cylindrical and comprises a longitudinal axis, which is parallel to and distinct from said fulcrum axis.

6. A wind power generator according to claim 5, wherein the containing casing comprises a first flange, which radially protrudes outside the containing casing itself, so as to be hinged to the support frame in correspondence to said fulcrum axis.

7. A wind power generator according to claim 5, wherein the actuation device comprises a limit stop member fitted to the support frame and two thrust members opposing each other, which are arranged on opposite sides of the limit stop member and act on the limit stop member in two thrust directions, which are opposite to each other and transverse to the fulcrum axis.

8. A wind power generator according to claim 7, wherein the containing casing comprises a second flange, which radially protrudes outside the containing casing itself, comprises the shape of a fork and comprises two arms extending on opposite sides of the limit stop member; each thrust member comprising an adjustment screw, which extends in the relative thrust direction and is screwed through a relative said arm, so as to be substantially arranged in contact with the limit stop member.

9. A wind power generator according to claim 8, wherein the distance between the two arms, measured parallel to the thrust direction, is greater than a dimension of the limit stop member in the thrust direction.

10. A wind power generator comprising:
a support tower;
a nacelle mounted in correspondence to an upper end of the support tower;
a rotor comprising a central hub coupled in a rotatory manner to the nacelle and a plurality of blades coupled in a rotatory manner to the hub itself so as to rotate around respective rotation axes; and, for each blade, a respective orienting device for orienting the blade around the respective rotation axis, the orienting device comprising a first gear mounted between said blade and the hub and at least one gearmotor, which is mounted on a support frame between said blade and the hub, and comprising a second gear coupled to the first gear; and wherein the gearmotor is hinged to said support frame so as to rotate around a fulcrum axis, which is substantially parallel to the relative rotation axis; an actuation device being provided so as to move the gearmotor around said fulcrum axis and to selectively control the position of the gearmotor around the fulcrum axis itself.

11. A wind power generator according to claim 10, wherein the actuation device comprises at least one actuation member acting on the gearmotor in a thrust direction, which is substantially transverse to said fulcrum axis.

12. A wind power generator according to claim 10 and further comprising a locking device for axially locking the gearmotor against the support frame.

13. A wind power generator according to claim 12, wherein the locking device comprises a plurality of fastening members, each of which extends through an opening through the support frame or through the gearmotor and wherein the opening includes a which is greater than a diameter of the fastening member itself.

14. A wind power generator according to claim 10, wherein the gearmotor comprises a containing casing, which is substantially cylindrical and comprises a longitudinal axis, which is parallel to and distinct from said fulcrum axis.

15. A wind power generator according to claim 14, wherein the containing casing comprises a first flange, which radially protrudes outside the containing casing itself, so as to be hinged to the support frame in correspondence to said fulcrum axis.

16. A wind power generator according to claim 14, wherein the actuation device comprises a limit stop member fitted to the support frame and two thrust members opposing each other, which are arranged on opposite sides of the limit stop member and act on the limit stop member in two thrust directions, which are opposite two each other and transverse to the fulcrum axis.

17. A wind power generator according to claim 16, wherein the containing casing comprises a second flange, which radially protrudes outside the containing casing itself, comprises the shape of a fork, and comprises two arms extending on opposite sides of the limit stop member; each thrust member comprising an adjustment screw, which extends in the relative thrust direction and is screwed through a relative said arm, so as to be substantially arranged in contact with the limit stop member.

18. A wind power generator according to claim 17, wherein the distance between the two arms, measured parallel to the thrust directions, is greater than a size of the limit stop member in the thrust direction.

* * * * *